United States Patent
Azechi et al.

(10) Patent No.: US 6,469,090 B2
(45) Date of Patent: Oct. 22, 2002

(54) ELECTRICALLY CONDUCTIVE LIQUID SILICONE RUBBER COMPOSITION

(75) Inventors: Syuuichi Azechi; Tsutomu Nakamura; Motoo Fukushima, all of Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/760,796

(22) Filed: Jan. 17, 2001

(65) Prior Publication Data

US 2001/0018482 A1 Aug. 30, 2001

(30) Foreign Application Priority Data

Jan. 17, 2000 (JP) .......................... 2000-007391

(51) Int. Cl.$^7$ .............................. C08K 3/31; C08K 9/02
(52) U.S. Cl. ..................... 524/492; 428/548; 524/493; 524/588; 524/440; 528/15; 528/24; 528/31; 528/32
(58) Field of Search ..................... 428/548; 524/403, 524/440, 492, 588, 493; 528/24, 31, 32, 15

(56) References Cited

U.S. PATENT DOCUMENTS

| | | | | |
|---|---|---|---|---|
| 4,547,312 A | * | 10/1985 | Graiver et al. .............. | 252/512 |
| 4,552,688 A | * | 11/1985 | Sakamoto et al. .......... | 252/511 |
| 4,777,205 A | * | 10/1988 | La Scola et al. ............ | 252/503 |
| 5,344,593 A | * | 9/1994 | Chiba et al. ................. | 252/512 |
| 6,358,615 B1 | * | 3/2002 | Imai ........................... | 428/403 |

FOREIGN PATENT DOCUMENTS

| | | | | | |
|---|---|---|---|---|---|
| JP | 01089209 A | * | 4/1989 | ............ | H01B/5/16 |
| JP | 01213362 A | * | 8/1989 | ............ | C08L/83/04 |
| JP | 2001184964 A | * | 7/2001 | ............ | H01H/1/02 |

* cited by examiner

*Primary Examiner*—Robert Dawson
*Assistant Examiner*—Marc S. Zimmer
(74) *Attorney, Agent, or Firm*—Birch, Stewart, Kolasch & Birch, LLP

(57) ABSTRACT

An electrically conductive liquid silicone rubber composition having (A) 100 parts by weight of an organopolysiloxane having a viscosity of 10–100,000 centipoise at 25° C., (B) 1–100 parts by weight of a finely divided silica powder, (C) 30–700 parts by weight of a metal powder or an electrically conductive metal-plated powder, and (D) a curing agent in an amount sufficient to cure the organopolysiloxane. The composition has a low volumetric resistivity, a stable electrical resistance and can be injection-molded and cured to give an outstanding silicone rubber that is useful in electrical components and electrical contacts employed in high-conductivity applications.

15 Claims, No Drawings

ELECTRICALLY CONDUCTIVE LIQUID SILICONE RUBBER COMPOSITION

BACKGROUND OF THE INVENTION

1. Field of the Invention

The present invention relates to heat-curable electrically conductive liquid silicone rubber compositions capable of being molded by such techniques as injection molding or insert molding, which compositions are suitable for use in fields that require high electrical conductivity of the sealants employed in the current contact portions of electrical components and mobile electrical units, and the sealants used in association with electromagnetic induction (EMI) shielding, office equipment rollers, antistatic materials, and connectors.

2. Prior Art

Silicone rubber compositions loaded with high-conductivity fillers are employed in fields that require sealants used in the current contact portions of electrical components and mobile electrical units and in association with EMI shielding and related materials to have a high degree of electrical conductivity.

Silicone rubber compositions composed largely of high-viscosity uncured rubber-like organosiloxanes require a pre-forming step and are thus troublesome to use. Production costs can be reduced by employing a molding process such as injection molding or insert molding that does not require pre-forming, but there are upper limits on the viscosity of compositions which can be used in such processes. To obtain good-quality molded articles from one of these molding processes, the composition generally should have a viscosity at 25° C. of not more than 100,000 poise.

However, lowering the electrical resistance of a silicone rubber largely composed of high-viscosity uncured rubbery organosiloxane requires the addition of a large amount of highly conductive filler to the organosiloxane. Such addition increases the viscosity of the composition, making injection molding or insert molding impossible to carry out.

SUMMARY OF THE INVENTION

It is therefore an object of the invention to provide an electrically conductive liquid silicone rubber composition which has a low volumetric resistivity, is capable of exhibiting stable electrical resistance, and can be injection-molded or insert-molded.

We have discovered that an organopolysiloxane having a viscosity of 10 to 100,000 centipoise (cp) at 25° C. in which specific amounts of a finely divided silica powder and either a metal powder or a metal-coated silica powder have been compounded and to which a curing agent has been added provides a heat-curable electrically conductive liquid silicone rubber composition which has a high electrical conductivity that is stable and which can be molded by such techniques as injection molding or insert molding.

Accordingly, the invention provides an electrically conductive liquid silicone rubber composition comprising (A) 100 parts by weight of an organopolysiloxane having a viscosity of 10 to 100,000 centipoise at 25° C., (B) 1 to 100 parts by weight of a finely divided silica powder, (C) 30 to 700 parts by weight of a metal powder or an electrically conductive metal-plated powder, and (D) a curing agent in an amount sufficient to cure the organopolysiloxane.

DETAILED DESCRIPTION OF THE INVENTION

Component A of the electrically conductive liquid silicone rubber composition of the invention is an organopolysiloxane having a viscosity of 10 to 100,000 cp at 25° C.

Preferably, the organopolysiloxane serving as component A has the average constitutional formula:

$$R^1_a SiO_{(4-a)/2} \quad (1),$$

wherein $R^1$ is a substituted or unsubstituted monovalent hydrocarbon group of 1 to 12 carbons, with from 0.001 to 20 mol % of the $R^1$ groups being alkenyl groups, and the letter "a" is a positive number from 1.5 to 2.8. An organopolysiloxane bearing at least two alkenyl groups per molecule is more preferred. The use of one or more such organopolysiloxane that is capped at both ends of the molecular chain with trivinylsilyl, divinylmethylsilyl or vinyldimethylsilyl groups is especially preferred.

Exemplary $R^1$ groups in the above formula are substituted or unsubstituted monovalent hydrocarbon groups having 1 to 12 carbons, and preferably 1 to 8 carbons, including alkyl groups such as methyl, ethyl, propyl, isopropyl, isobutyl, butyl, tert-butyl, pentyl, neopentyl, hexyl, octyl, nonyl and decyl; cycloalkyl groups such as cyclohexyl; alkenyl groups such as vinyl, allyl, propenyl, isopropenyl, butenyl, isobutenyl, hexenyl and octenyl; cycloalkenyl groups such as cyclohexenyl; aryl groups such as phenyl, tolyl, xylyl and naphthyl; aralkyl groups such as benzyl, phenylethyl and phenylpropyl; and any of the foregoing groups in which some or all of the hydrogen atoms attached to carbon atoms have been replaced with substituents such as halogen atoms or cyano groups, including chloromethyl, bromoethyl, 3,3,3-trifluoropropyl, 3-chloropropyl and cyanoethyl. The $R^1$ moiety preferably has an unsaturated aliphatic group (referred to hereinafter as "alkenyl group") content, based on all the organic groups, within a range of 0.001 to 20 mol %, and especially 0.01 to 10 mol %. As noted above, it is advantageous for the $R^1$ moiety to have at least two alkenyl groups. Vinyl is preferred as the alkenyl group. The introduction of other substituents such as methyl and phenyl is also preferred. In the above constitutional formula (1), the letter "a" stands for a positive number from 1.5 to 2.8, and preferably from 1.8 to 2.5.

The organopolysiloxane of formula (1) is preferably a linear diorganopolysiloxane which may include $R^1SiO_{3/2}$ units and $SiO_{4/2}$ units within a range that does not compromise the rubber elasticity of the cured product thereof, which has a backbone that is basically composed of recurring $R^1_2SiO_{2/2}$ diorganosiloxane units, and which is capped at both ends of the molecular chain with $R^1_3SiO_{1/2}$ triorganosiloxy units insofar as this does not compromise the rubber elasticity of the cured product. The alkenyl groups in the molecule may be bonded to silicon atoms either at the ends of the molecular chain or at the middle of the chain, or both, although the presence of alkenyl groups bonded to at least the silicon atoms at both ends of the molecular chain is preferable in terms of the curability of the composition and the properties of the cured product.

The alkenyl group-bearing organopolysiloxane may be prepared by a known method. According to one suitable method, preparation may involve carrying out an equilibrium reaction between an organopolysiloxane and a hexaorganodisiloxane in the presence of an alkali or acid catalyst.

The organopolysiloxane serving as component A has a viscosity at 25° C. within a range of 10 to 100,000 cp, and preferably 50 to 50,000 cp. At a viscosity below 10 cp, component C tends to settle out of the composition and the cured conductive silicone rubber is often brittle, whereas a viscosity greater than 100,000 cp often makes it difficult to carry out injection molding or insert molding.

Component B of the silicone rubber composition of the invention is a finely divided silica powder. Any such powder that is used in conventional silicone rubber compositions, with the exception of metal-plated silica powder, may be employed without particular limitation as component B. Illustrative examples include precipitated silica, fumed silica and fired silica having a specific surface area, as measured by the BET method, of at least 50 $m^2/g$, and especially 50 to 400 $m^2/g$. Other suitable examples include pulverized silica having an average particle size of up to 50 μm, and preferably within a range of 0.1 to 20 μm. Any one or combinations of two or more of these silica powders may be used.

The finely divided silica powder may be used directly without modification. Alternatively, it may be used in the form of a hydrophobic silica powder prepared by surface treating the finely divided silica powder with a silazane such as hexamethyldisilazane, a silane such as trimethylchlorosilane or an organosilicon compound such as polymethylsiloxane, or it may be rendered hydrophobic by blending it with a surface treatment agent during compounding.

Component B is incorporated in an amount of 1 to 100 parts by weight, and preferably 2 to 50 parts by weight, per 100 parts by weight of the organopolysiloxane serving as component A. The use of less than 1 part by weight may lower the mechanical strength of the cured product, whereas the use of more than 100 parts by weight tends to make proper loading of the conductive filler serving as component C more difficult, adversely affecting the workability of the composition.

Component C is a metal powder or a conductive metal-plated powder whose purpose is to confer the liquid silicone rubber composition of the invention with electrical conductivity.

No limitations are imposed on the particle size of the metal powder, although an average particle size within a range of 0.05 to 100 μm, and especially 0.1 to 10 μm, is preferred.

The metal powder may have any suitable particle shape, including granular, dendritic or flake-like, or may be of non-specific shape. Alternatively, a mixture of metal powders having a combination of these shapes may be used. To form a silicone rubber of low electrical resistance, it is desirable for the metal particles to be partially linked rather than dispersed in a state of complete mutual isolation.

Illustrative examples of metal powders that may be used in the invention include silver powder, gold powder and nickel powder, of which silver powder is especially preferred.

Any silver powder may be used without particular limitation, including those produced by electrolysis, grinding, heat treatment, atomization or chemical processes.

Any suitable known apparatus may be used to produce ground silver powder, including a stamp mill, ball mill, vibratory mill, hammer mill, pressure rollers or mortar and pestle. Nor is there any particular limitation on the conditions for rolling silver powder composed of reduced silver, atomized silver, electrolytic silver or mixtures of two or more thereof. Rather, it is essential to select such conditions according to such considerations as the particle size and shape of the silver powder to be used.

Illustrative examples of conductive metal-plated powders that may be used as component C of the invention include metal-plated silica powder and glass beads or phenol resin plated with silver. Metal-plated silica powder is preferred. Metal-plated silica powder is silica powder the surface of which has been coated by metal plating. Examples of suitable plating metals include gold, silver and nickel, of which gold and nickel are especially preferred.

The metal-plated silica powder has a specific surface of preferably at most 1 $m^2/g$. A surface area greater than 1 $m^2/g$ may result in poor dispersibility when the powder is added to the silicone rubber composition.

The metal-plated silica powder preferably has a construction comprising silica covered with a nickel layer which in turn is covered with a gold layer. A four-layer construction of silica/silicon compound/nickel/gold in which a silicon compound lies between the silica and the nickel is especially advantageous for improving adhesion between the metal and the silica. Preferred examples of the silicon compound include carbon-functional (CF) silane monomers such as those made by Shin-Etsu Chemical Co., Ltd under the trade name designations KBM-603, KBM-903, KBE-603 and KBE-903, and silicon-based polymeric compounds with reducing properties.

The method of producing the metal-plated silica powder is not subject to any particular limitation. A typical example of production includes the following steps.

(1) A first step in which silica powder is treated with a silicon compound, preferably one with reducing properties, to form a layer of the silicon compound on the surface of the silica.

(2) A second step in which the powder resulting from the first step is treated with a solution containing a metal salt composed of metal having a standard redox potential of at least 0.54 to induce the deposition of a colloid of the metal onto the silicon compound layer that has been formed over the silica surface.

(3) A third step in which electroless nickel plating is carried out using the above metal colloid as the catalyst so as to form a layer of metallic nickel on the surface of the silicon compound layer.

(4) A fourth step in which gold plating is carried out, thereby forming a layer of gold on the metallic nickel layer. These four steps are described more fully below.

The silica starting material used to form the metal-plated silica powder serving as component C of the invention is a powder composed of silicon dioxide, and thus has a high heat resistance. The particles making up the silica starting material may have any suitable shape, such as powdery, fibrous or flake-like, although a spherical shape, because it has the smallest specific surface area for a given particle size, is desirable for minimizing the amount of plating metal (typically nickel or gold) used and for achieving high loading in the silicone rubber composition. Such silica can be easily prepared by such methods as burning chlorosilane, hydrolyzing alkoxysilane, oxidizing gasified metallic silicon or fusing silica powder. To lower the specific surface area, it is desirable for the silica particles to have no interior cavities that communicate with the particle surface. The use of fused silica is especially preferred. The silica powder has an average particle size in a range of 0.01 to 1,000 μm, and preferably 0.1 to 100 μm. At less than 0.01 μm, the specific surface area becomes large and may require the use of such a large amount of plating metal as to be prohibitively expensive. On the other hand, at a particle size greater than 1,000 μm, the metal-plated silica powder may be difficult to mix into the silicone rubber composition.

Production of the metal-plated silica powder according to the invention is preferably carried out by treating the above-described silica powder with a silicon compound having reducing properties so as to form a layer of the silicon compound on the surface of the silica.

Examples of reducing silicon compounds that may be used here include, in addition to the carbon-functional silane monomers referred to above, polysilanes, polycarbosilanes, polysiloxanes and polysilazanes having silicon-silicon or silicon-hydrogen bonds. Of these, polysiloxanes with hydrogen atoms directly bonded to silicon atoms and polysilanes are especially preferred.

Exemplary silanes include polymeric compounds of the following general formula which have silicon-silicon bonds on the main chain.

$$(R^2{}_m R^3{}_n XPSi)_q \qquad (2)$$

In formula (2), $R^2$ and $R^3$ are each independently a hydrogen or a substituted or unsubstituted monovalent hydrocarbon group such as an aliphatic, alicyclic or aromatic monovalent hydrocarbon group. Examples of suitable aliphatic or alicyclic monovalent hydrocarbon groups include $C_{1-12}$, and especially $C_{1-6}$, alkyl groups (e.g., methyl, ethyl, propyl, butyl, pentyl, hexyl) and cycloalkyl groups (e.g., cyclopentyl, cyclohexyl). Suitable aromatic monovalent hydrocarbon groups include those having 6 to 14 carbons, and preferably 6 to 10 carbons, such as phenyl, tolyl, xylyl, naphthyl and benzyl. Suitable substituted monovalent hydrocarbon groups include the aforementioned unsubstituted monovalent hydrocarbon groups on which some or all of the hydrogen atoms have been replaced with substituents such as halogen atoms, alkoxy groups, amino groups or aminoalkyl groups. Specific examples of such substituted monovalent hydrocarbon groups include monofluoromethyl, trifluoromethyl and m-dimethylaminophenyl.

In above formula (2), X may be the same type of group as $R^2$, an alkoxy, a halogen atom, an oxygen atom or a nitrogen atom. Suitable alkoxy groups include those having 1 to 4 carbons, such as methoxy, ethoxy and isopropoxy. Suitable halogen atoms include fluorine, chlorine and bromine. Of the above, it is generally preferable for X to be methoxy or ethoxy.

In formula (2), the letter m is from 0.1 to 1, and preferably from 0.5 to 1; the letter n is from 0.1 to 1, and preferably from 0.5 to 1; and the letter p is from 0 to 0.5, and preferably from 0 to 0.2. The sum m+n+p is from 1 to 2.5, and preferably from 1.5 to 2. In addition, the letter q is an integer from 2 to 100,000, and preferably from 10 to 10,000.

The silicon compound having hydrogen atoms bonded directly to silicon atoms (Si-H groups) may be any organohydrogenpolysiloxane with hydrogen atoms bond directly to silicon atoms, although the use of a polysiloxane of general formula (3) below having pendant Si-H groups and having Si-O-Si bonds on the main chain is preferred.

$$(R^4{}_r R^5{}_s H_t SiO_u)_v \qquad (3)$$

In formula (3), $R^4$ and $R^5$ are each independently a hydrogen, a substituted or unsubstituted monovalent hydrocarbon group, an alkoxy group or a halogen atom. Monovalent hydrocarbon groups that may be used include aliphatic, alicyclic and aromatic monovalent hydrocarbon groups. Suitable aliphatic or alicyclic monovalent hydrocarbon groups include $C_{1-12}$, and especially $C_{1-6}$, alkyl groups (e.g., methyl, ethyl, propyl, butyl, pentyl, hexyl) and cycloalkyl groups (e.g., cyclopentyl, cyclohexyl). Suitable aromatic monovalent hydrocarbon groups include those having 6 to 14 carbons, and preferably 6 to 10 carbons, such as phenyl, tolyl, xylyl, naphthyl and benzyl. Suitable substituted aliphatic, alicyclic and aromatic monovalent hydrocarbon groups include the aforementioned unsubstituted monovalent hydrocarbon groups on which some or all of the hydrogen atoms have been replaced with substituents such as halogen atoms, alkoxy groups, amino groups or aminoalkyl groups. Specific examples of such substituted monovalent hydrocarbon groups include monofluoromethyl, trifluoromethyl and m-dimethylaminophenyl. Suitable alkoxy groups include those having 1 to 4 carbons, such as methoxy, ethoxy and isopropoxy. Suitable halogen atoms include fluorine, chlorine and bromine. The use of methoxy and ethoxy as $R^4$ and $R^5$ is generally preferred.

In formula (3), the letter r is from 0.1 to 1, and preferably from 0.5 to 1; the letter s is from 0.1 to 1, and preferably from 0.5 to 1; and the letter t is from 0.01 to 1, and preferably from 0.1 to 1. The sum r+s+t is from 2 to 2.5, and preferably from 2 to 2.5. In addition, the letter u is from 1 to 1.5; and the letter v is an integer from 2 to 100,000, and preferably from 10 to 10,000.

The step in which a layer of the silicon compound is formed on the silica surface (Step 1) may be carried out by dissolving the silicon compound in an organic solvent, adding and mixing the silica powder into the solution, then removing the organic solvent so as to leave a layer of the silicon compound on the surface of the silica.

Suitable examples of the organic solvent which may be used to dissolve the silicon compound in this step include aromatic hydrocarbon solvents such as benzene, toluene and xylene; aliphatic hydrocarbon solvents such as hexane, octane and cyclohexane; ether solvents such as tetrahydrofuran and dibutyl ether; ester solvents such as ethyl acetate; polar aprotic solvents such as dimethyl-formamide, dimethylsulfoxide and hexamethylphosphoric triamide; and nitromethane and acetonitrile.

The silicon compound-containing solution typically has a concentration of from 0.01 to 30% by weight, and preferably 1 to 10% by weight. At less than 0.01% by weight, the large amount of solvent required tends to increase costs excessively. On the other hand, at a concentration above 30%, the silicon compound may not form sufficiently as a layer over the entire surface of the powder.

Preferred methods for treating the silica powder with the silicon compound-containing organic solvent solution include a stirring technique in which the silicon compound is dissolved in a solvent to form a dilute state which is then mixed with the silica powder, and the resulting slurry is stirred with an agitating element in a vessel to effect dispersion and contact; and a spray technique in which the same slurry is dispersed in a stream of air to effect instantaneous drying.

In the above-described treatment step, the organic solvent is driven off by raising the temperature and/or applying a vacuum. It is generally effective to carry out drying by stirring at a temperature above the boiling point of the solvent, such as a temperature of about 40 to 200° C. under a vacuum of 1 to 100 mmHg.

Following treatment, by placing the treated powder in a drying atmosphere or heating it for a while at about 40 to 200° C. under reduced pressure, the solvent can be effectively removed. Drying of the treated powder in this manner yields a silicon compound-treated silica powder.

The silicon compound layer has a thickness in a range of preferably 0.001 to 1 $\mu$m, and especially 0.01 to 0.1 $\mu$m. At less than 0.001 $\mu$m, the silica may not be completely covered, as a result of which improperly plated areas may arise in a later step. On the other hand, at a thickness greater than 1 $\mu$m, the amount of silicon compound used may become so large as to entail excessive costs.

Silicon compound treatment renders the silica powder hydrophobic. The treated silica powder thus has a lowered affinity with the solvent used to dissolve the metal salt and may not disperse well therein, lowering the efficiency of the metal salt reduction reaction. Such a decline in the efficiency of the metal salt reduction reaction can be countered by the addition of a surfactant. Preferred surfactants are those which lower the surface tension without inducing the formation of foam. Illustrative examples of surfactants suitable for this purpose include the nonionic surfactants Surfynol 104, 420 and 504, all products of Nisshin Chemical Industry Co., Ltd.

In the next step (Step 2), the powder obtained in step 1 by forming a silicon compound layer on the silica surface is treated with a solution containing a metal salt of a metal having a standard redox potential of at least 0.54 V to induce the deposition of a colloid of the metal onto the silicon compound layer. This step involves contacting the surface of the silicon compound-treated powder with a metal salt-containing solution. The reducing action of the silicon compound causes a colloid of the metal to form on the surface of the silicon compound film, resulting in the formation of a metal film.

Suitable examples of the salts of a metal having a standard redox potential of at least 0.54 V which may be used in this step include salts of gold (standard redox potential, 1.50 V), palladium (standard redox potential, 0.99 V) or silver (standard redox potential, 0.80 V). Salts of metals having a standard redox potential lower than 0.54 V, such as copper (standard redox potential, 0.34 V) and nickel (standard redox potential, 0.25 V), are not easily reduced by the silicon compound.

The gold salt is a salt containing $Au^+$ or $Au^{3+}$, such as $NaAuCl_4$, $NaAu(CN)_2$ and $NaAu(CN)_4$. The palladium salt is a salt containing $Pd^{2+}$, which can generally be expressed in the form $PdZ_2$, wherein Z is a halogen such as chlorine, bromine or iodine, acetate, trifluoroacetate, acetylacetonate, carbonate, perchlorate, nitrate, sulfate or oxide. Specific examples of suitable palladium salts include $PdCl_2$, $PdBr_2$, $PdI_2$, $Pd(OCOCH_3)_2$, $Pd(OCOCF_3)_2$, $PdSO_4$, $Pd(NO_3)_2$ and PdO. The silver salt is a salt which dissolves in the solvent to form $Ag^+$ ions, and can generally be represented as AgZ, wherein Z is perchlorate, borate, phosphate or sulfonate. Specific examples of suitable silver salts include $AgBF_4$, $AgClO_4$, $AgPF_6$, $AgBPh_4$ (wherein "Ph" stands for phenyl), $Ag(CF_3SO_3)$ and $AgNO_3$.

Suitable examples of the solvent used to dissolve the metal salt include water, ketones such as acetone and methyl ethyl ketone, alcohols such as methanol and ethanol, and polar aprotic solvents such as dimethylformamide, dimethylsulfoxide and hexamethylphosphoric triamide. Of these, water is preferred.

The concentration of the metal salt varies according to the solvent used to dissolve the salt, although a concentration within a range of from 0.01% by weight to the saturation concentration is preferred. At less than 0.1% by weight, the plating catalyst may not be adequately effective, whereas a concentration greater than that needed to give a saturated solution often results in the precipitation of solid salt. When the solvent is water, the metal salt concentration is preferably within a range of 0.01 to 20%, and especially 0.1 to 5%. The silicon compound-treated powder is generally immersed in the metal salt solution at a temperature within a range of room temperature to 70° C. for a period of about 0.1 to 120 minutes, and preferably about 1 to 15 minutes, thereby forming a metal colloid-treated powder.

Step 2 is preferably carried out by first contacting the silicon compound-treated powder with a water-diluted surfactant, then contacting the powder with the above-described metal salt solution. This makes it possible to prevent the decrease in efficiency of the metal salt reducing reaction that would otherwise arise from the hydrophobizing effect of silicon compound treatment in step 1 on the silica surface, which reduces affinity of the powder to the metal salt-dissolving solvent and thus discourages dispersion of the powder in the solution. Thus, by first contacting the silicon compound-treated powder with a water-diluted surfactant, the silicon compound-treated powder can be easily and rapidly dispersed in the metal salt-containing solution.

The surfactant used for this purpose may be an anionic surfactant, cationic surfactant, amphoteric surfactant or nonionic surfactant.

Suitable anionic surfactants include sulfonate, sulfate, carboxylate and phosphate surfactants. Suitable cationic surfactants include ammonium salt, alkylamine salt and pyridinium salt surfactants. Suitable amphoteric surfactants include betaine, aminocarboxylic acid and amine oxide surfactants. Suitable nonionic surfactants include ether, ester and silicone surfactants.

Specific types of anionic surfactants that may be used include alkylbenzenesulfonates, sulfosuccinates, alkyl polyoxyethylenesulfates, alkylphosphates, and long-chain fatty acid soaps. Cationic surfactants that may be used include alkyltrimethylammonium chloride, dialkyldimethylammonium chloride and alkylpyridinium chloride. Amphoteric surfactants that may be used include betaine sulfonates and the betaine aminocarboxylates. Nonionic surfactants that may be used include polyoxyethylene alkyl ethers, polyoxyethylene fatty acid esters and polyoxyalkylene-modified polysiloxanes. Use can also be made of commercially available aqueous solutions of surfactant mixtures, such as those manufactured by Lion Corporation under the trade name Mama Lemon.

If necessary, a surfactant such as any of those described above may be used in an amount of 0.0001 to 10 parts, preferably 0.001 to 1 part, and especially 0.01 to 0.5 part, per 100 parts of the metal salt solution.

Following metal salt treatment, excess metal salt that has not been supported on the powder is removed by treatment with the same type of solvent as described above, but containing no metal salt, after which the powder is dried to remove unwanted solvent. Drying is preferably carried out at a temperature of 0 to 150° C., either under atmospheric pressure or in a vacuum.

In Step 3, electroless nickel plating is carried out using as the catalyst the metal colloid that has been deposited on the surface of the powder particles, thereby forming a layer of metallic nickel on the surface of the silicon compound layer.

The electroless nickel plating solution generally contains a water-soluble metallic nickel salt such as nickel sulfate or nickel chloride, a reducing agent such as sodium hypophosphite, hydrazine or sodium borohydride, a pH modifier such as sodium acetate, and a complexing agent such as phenylenediamine or sodium potassium tartrate. A commercial electroless nickel plating solution may be used for the purposes of the invention.

The electroless nickel plating process may be carried out in accordance with normal practice. That is, use may be made of a batch process in which plating is effected by adding the powder to the electroless plating solution, or a dropwise addition process in which the plating solution is gradually added to the powder dispersed in water (see Dodensei fira no kaihatsu to oyo (Development and use of electrically conductive fillers), Gijutsu Joho Kyokai, 1994, p. 182). Whichever method is used, it is important to control the plating rate so as to prevent agglomeration of the particles and obtain a uniform nickel film that adheres well. However, it can be difficult to obtain good nickel-coated silica such as this. For example, in powders having a high specific surface area, because the plating reaction is very vigorous, it tends to start abruptly and becomes impossible to control. Conversely, the start of plating may be delayed due to the influence of ambient oxygen, in which case nickel plating takes a long time and is less likely to yield a uniformly plated powder.

Accordingly, it is advantageous to use the following process to nickel plate silica. The nickel plating solution is divided into an aqueous solution containing, for example, a reducing agent, pH modifier and complexing agent, and an aqueous solution of the nickel salt. The silica is dispersed in the aqueous solution containing the reducing agent, pH modifier and complexing agent, and is held at the optimal temperature for nickel plating. The nickel salt solution is then added by entrainment with a gas to the reducing agent-containing aqueous solution in which the silica has been dispersed. We have found this process to be very effective for preparing nickel-coated silica free of agglomeration. The gas used to entrain the nickel salt solution has the effect of rapidly and uniformly dispersing this solution in the aqueous solution containing the reducing agent, pH modifier and complexing agent, thereby plating the surface of the powder with nickel.

The introduction of gas sometimes lowers the plating efficiency due to foaming, but this can be prevented by the addition of an antifoaming surfactant. The surfactant used for this purpose should be one which has an antifoaming action that lowers the surface tension. Suitable surfactants include polyether-modified silicone surfactants such as KS-538 (made by Shin-Etsu Chemical Co., Ltd.).

In electroless nickel plating, the oxygen concentration in the plating solution exerts an influence on the precipitation of nickel. A large amount of dissolved oxygen interferes with nickel deposition, either by causing the colloidal palladium serving as the plating catalyst nuclei to oxidize to palladium cations, which then dissolve into the plating solution, or by oxidizing the surface of the nickel that has already been deposited. On the other hand, the presence of too little dissolved oxygen lowers the stability of the plating solution, causing nickel to deposit in places other than on the silica and resulting in the formation of fine nickel dust or bumpy deposits. It is therefore preferable for the amount of dissolved oxygen in the plating solution to be maintained within a range of 1 to 20 ppm. The presence of more than 20 ppm of oxygen may result in a decline in the plating rate and the emergence of unplated areas, whereas less than 1 ppm may lead to the formation of bumpy deposits.

The gas used for the above purpose is preferably a mixture of an oxygen-containing gas such as air and an inert gas such as argon or nitrogen. In the powder plating process, plating is often slow to begin, but once it does begin, reaction runaway may occur. One effective way to keep this from happening is to use nitrogen at the beginning and, after confirming that the nickel plating reaction has begun, to subsequently switch over to air. Typically, the plating temperature is from 35 to 120° C., and the catalyst contact time is from 1 minute to 16 hours. Treatment conditions of 40 to 85° C. and 10 to 60 minutes are preferred.

In Step 4, which follows the above-described electroless nickel plating step, gold plating is carried out so as to form a layer of gold on the deposited layer of nickel.

The gold plating solution may be an electroplating solution or an electroless plating solution. Use may be made of a solution of known composition or a commercial product, although an electroless gold plating solution is preferred.

The gold plating process may be carried in accordance with the conventional plating process described above. It is effective to carry out gold plating after using a dilute acid to remove the surface of the nickel that has been passivated by oxidation. The gold plating temperature and catalyst contact time are the same as in nickel plating.

At the end of the plating process, the treated powder should be rinsed with water to remove unwanted surfactant. The powder obtained from this process is a metal-plated silica powder having a silica/silicon compound/nickel/gold four-layer construction.

The nickel layer has a thickness within a range of preferably 0.01 to 10.0 $\mu$m, and especially 0.1 to 2.0 $\mu$m. At less than 0.01 $\mu$m, it may be difficult to obtain a metal-plated silica powder in which the silica is completely covered, and which has sufficient hardness and strength. On the other hand, at a thickness greater than 10.0 $\mu$m, the amount of nickel becomes large and the specific gravity high, which may make the metal-plated silica powder too expensive for compounding in the silicone rubber composition of the invention.

The gold layer has a thickness within a range of preferably 0.001 to 1.0 $\mu$m, and especially 0.01 to 0.1 $\mu$m. At less than 0.001 $\mu$m, the resistivity becomes so high that compounding of the metal-plated silica powder may fail to impart the inventive composition with sufficient electrical conductivity. On the other hand, at a thickness greater than 1.0 $\mu$m, the amount of gold used may become so great as to be prohibitively expensive.

Finally, it is advantageous for the metal-plated silica powder obtained by the process described above to be heat treated in the presence of an inert gas such as $N_2$ or a reducing gas such as $H_2$ and at a temperature of at least 200° C. The treatment conditions are typically a temperature of 200 to 900° C., and a treatment time of 1 minute to 24 hours, although treatment conditions of 250 to 500° C. and 30 minutes to 4 hours are preferred. Such heat treatment converts the silicon compound situated between the silica powder and the metal to a ceramic, which has a higher heat resistance, dielectric properties and adhesion. Carrying out heat treatment in a reducing atmosphere such as hydrogen decreases the amount of oxide in the metal and transforms the silicon compound to a more stable structure, resulting in strong bonding between the silica and the metal, and ultimately giving a powder having a high electrical conductivity.

Heat treatment in such a hydrogen reducing environment converts the silicon compound primarily to a silicon carbide ceramic. That is, the above-described high temperature treatment converts some or all of the silicon compound between the silica powder and the metal film to a ceramic, which has a higher heat resistance, dielectric properties and adhesion than the silicon compound.

The metal-plated silica powder may be imparted with affinity to silicone by administering hydrophobic treatment using, for example, any of various alkoxysilanes, titanate treatment agents, carbon-functional silanes, silazanes, or silanol-containing oligomeric siloxanes.

The inventive composition may include, together with component C, another electrically conductive material, examples of which include known conductive inorganic substances such as conductive carbon black, conductive zinc oxide and conductive titanium oxide; and/or, a thickening agent, examples of which include fillers such as silicone rubber powder, red iron oxide and calcium carbonate.

The amount of component C included in the inventive composition is 30 to 700 parts by weight, and preferably 50 to 700 parts by weight, per 100 parts by weight of the organopolysiloxane serving as component A. The use of less than 30 parts by weight fails to provide the desired low electrical resistance, whereas an amount greater than 700 parts by weight compromises the processability of the composition to such an extent as to render injection molding impossible.

Component D of the inventive silicone rubber composition is a curing agent. In the practice of the invention, the components described above are uniformly blended using a rubber compounding apparatus such as a two-roll mill, a Banbury mixer or a dough mixer (kneader). If necessary, the blend is heat-treated at atmospheric pressure or reduced pressure. The resulting electrically conductive liquid silicone rubber composition is then cured by adding and blending therein a suitable curing agent, thereby giving a stable rubber elastomer having a high degree of electrical conductivity. The curing process employed for this purpose may be an organic peroxide-based curing process or an addition curing process involving the use of an addition crosslinking agent and a catalyst.

If an organic peroxide-based curing process is employed, this is carried out using an organic peroxide curing agent, preferred examples of which include benzoyl peroxide, 2,4-dichlorobenzoyl peroxide, p-methylbenzoyl peroxide, 2,4-dicumyl peroxide, 2,5-dimethylbis(2,5-t-butylperoxy) hexane, di-t-butyl peroxide and t-butyl perbenzoate.

The organic peroxide may be used singly or as a combination of two or more thereof. The amount of organic peroxide addition is preferably 0.1 to 10 parts by weight, and especially 0.2 to 5 parts by weight, per 100 parts by weight of the organopolysiloxane serving as component A. The addition of too little organic peroxide may result in inadequate crosslinkage, whereas the addition of more than the above range may fail to provide any additional improvement in the curing speed.

Curing processes which involve an addition reaction use as the curing agent an addition reaction-type curing agent composed of a conventional organohydrogenpolysiloxane and a platinum metal-based addition reaction catalyst. The organohydrogenpolysiloxane used in this case may be one having the following general formula.

$$R^6{}_bH_cSiO_{(4-b-c)/2} \qquad (4)$$

In formula (4), $R^6$ is a substituted or unsubstituted monovalent hydrocarbon group of 1 to 10 carbons, and is exemplified by the same groups as mentioned earlier for $R^1$ in formula (1), although a group without aliphatic unsaturated bonds is preferred. The letter b is a positive number from 0.7 to 2.1, and preferably from 1 to 2. The letter c is a positive number from 0.002 to 1, and preferably from 0.01 to 0.9. The sum b+c is a positive number from 0.8 to 3, and preferably from 1.5 to 2.8.

The organohydrogenpolysiloxane acts as a crosslinking agent with respect to component A in the presence of an addition reaction catalyst. Each molecule has at least two, and preferably at least three, hydrogen atoms bonded to silicon atoms. These Si-H bonds may be positioned at the ends of the molecular chain, in the middle of the molecular chain, or in both places.

Illustrative examples of such organohydrogenpolysiloxanes include methylhydrogenpolysiloxane capped at both ends with trimethylsiloxy groups, dimethylsiloxane-methylhydrogenpolysiloxane copolymers capped at both ends with trimethylsiloxy groups, dimethylsiloxane capped at both ends with dimethylhydrogensiloxy groups, dimethylsiloxane capped at both ends with dimethylhydrogenpolysiloxy groups, dimethylsiloxane-methylhydrogenpolysiloxane copolymers capped at both ends with dimethylhydrogenpolysiloxy groups, methylhydrogenpolysiloxane-diphenylsiloxane-dimethylsiloxane copolymers capped at both ends with trimethylsiloxy groups, copolymers composed of $(CH_3)_2HSiO_{1/2}$ units and $SiO_{4/2}$ units and copolymers composed of $(CH_3)_2HSiO_{1/2}$ units, $SiO_{4/2}$ units and $(C_6H_5)SiO_{3/2}$ units. The organohydrogenpolysiloxane of above formula (4) has a molecular structure which may be linear, branched, cyclic or a three-dimensional network structure. The molecular weight is not subject to any particular limitation, although the compound is preferably liquid at room temperature. The viscosity at 25° C. is in a range of preferably 0.1 to 1,000 cp, and especially 0.5 to 500 cp. Such a organohydrogenpolysiloxane may be prepared by a suitable known process.

The foregoing organohydrogenpolysiloxane is included in the silicone rubber composition of the invention in an amount of preferably 0.1 to 100 parts by weight, more preferably 0.3 to 50 parts by weight, and most preferably 0.5 to 20 parts by weight, per 100 parts by weight of the organopolysiloxane serving as component A. Addition of too little organohydrogenpolysiloxane may result in inadequate crosslinkage, whereas addition in an amount greater than the above range may fail to provide the desired increase in curing rate.

It is particularly advantageous for the organohydrogenpolysiloxane to be added in an amount such that the molar ratio of hydrogen atoms bonded to silicon atoms (Si-H groups) therein, relative to alkenyl groups in the organopolysiloxane serving as component A, is in a range of 0.3 to 20, and especially 0.8 to 3.

The addition reaction catalyst may be platinum black, platinic chloride, the reaction product of hexachloro-platinic acid with a monohydric alcohol, a hexachloro-platinic acid-olefin complex, platinum bisacetoacetate, a palladium catalyst or a rhodium catalyst. The addition reaction catalyst is preferably included in an amount, based on the platinum, palladium or rhodium metal, within a range of 0.1 to 2,000 ppm, and especially 1 to 500 ppm, per 100 parts of the organopolysiloxane serving as component A.

Insofar as the desired effects of the invention are attainable, the addition-curable organopolysiloxane component may also have added thereto, as an optional component other than the above-described main components, one or more addition reaction regulators selected from among vinyl group-bearing organopolysiloxanes such as vinylcyclotetrasiloxane, triallyl isocyanate, alkyl maleates, acetylene alcohols such as ethynylcyclohexanol, modified silanes and siloxanes, hydroperoxide, tetramethylethylenediamine, benzotriazole, and mixtures thereof,.

In addition to the components described above, the electrically conductive liquid silicone rubber compositions of the invention may also include a non-reactive silicone oil to impart water repellency and sealing and slip properties. Illustrative examples of suitable silicone oils include linear dimethylpolysiloxane, diphenylpolysiloxane, phenylmethylpolysiloxane and hydroxyl group-bearing organopolysiloxane. If necessary, the composition may also include various additives, such as metal oxides (e.g., titanium oxide, iron oxide, cerium oxide, vanadium oxide, cobalt oxide, chromium oxide, manganese oxide). Additional constituents that may be included, to the extent that the objects and effects of the invention are not compromised, include pigments, heat stabilizers, flame retardants, plasticizers and reaction regulators. When carrying out integral molding with a resin, an Si-H group-bearing organosilicon compound, an epoxy group-bearing organosilicon compound, an alkoxy group-bearing organosilicon compound or a mixture thereof, or an organosilicon compound bearing more than one of the foregoing functional groups, may be added as an adhesion promoter to impart good adhesion to plastics, glass, metal and other materials. These optional constituents may be added in conventional amounts within ranges that do not compromise the objects and effects of the invention.

The electrically conductive liquid silicone rubber composition of the invention may be prepared by uniformly mixing the above-described components A to D and other, optional, components at room temperature. However, if necessary, it is possible to heat-treat all the components other than component D in a suitable apparatus such as a planetary mixer or kneader at a temperature of 100 to 200° C. for a period of 30 minutes to 4 hours, and subsequently mix in component D to effect curing and molding. The molding method may be selected as appropriate for the viscosity of the mixture. Examples of suitable molding methods include casting, compression molding, injection molding and transfer molding. Curing conditions of 80 to 200° C. for about 3 minutes to 3 hours are generally preferred.

The molding method used in the present invention is preferably injection molding. For injection molding purposes, it is preferable for the composition has a viscosity at 25° C. of 300 to 100,000 poise, and especially 1,000 to 5,000 poise.

The above-described electrically conductive silicone rubber compositions of the invention have a low volumetric resistivity, a stable electrical resistance and can be injection-molded and cured to give an outstanding silicone rubber. The resulting silicone rubber is useful in electrical components and electrical contacts employed in high-conductivity applications.

EXAMPLES

Examples of the invention and comparative examples, wherein parts are by weight, are given below by way of illustration and not by way of limitation.

Synthesis Example
Synthesis of Metal-Plated Silica Powder Silicon Compound
Treatment of Silica Five grams of phenylhydrogenpolysilane (PPHS) was dissolved in 65 g of toluene, and the resulting solution was added to 100 g of US-10, a spherical silica manufactured by Mitsubishi Rayon Co., Ltd. (average particle size, 10μ; specific surface area, 0.4 m$^2$/g), as the starting silica material. The mixture was stirred for one hour to form a slurry. Drying was subsequently carried out by driving off the 65 g of toluene in a rotary evaporator at a temperature of 80° C. and a pressure of 45 mmHg, yielding PPHS-treated spherical silica. The treated silica was then pulverized using rollers or a jet mill.
Preparation of Palladium Colloid-Coated Silica When poured into water, the PPHS-treated spherical silica floats at the water's surface because the silica has been rendered hydrophobic by the preceding treatment. One hundred grams of the PPHS-treated spherical silica was poured into 50 g of a 0.5% aqueous solution of Surfynol 504 (a surfactant manufactured by Nisshin Chemical Industry Co., Ltd.) and dispersed therein by stirring. Palladium treatment was carried out by adding 70 g of a 1% aqueous solution of PdCl$_2$ (palladium chloride content, 0.7 g; palladium content, 0.4 g) to 150 g of the silica-water dispersion, stirring for 30 minutes, then filtering and rinsing with water. This treatment yielded a grayish-black colored palladium colloid-coated silica composed of silica particles on the surface of which palladium colloid had been deposited. After separating off the resulting silica by filtration and rinsing it with water, the silica was immediately submitted to the nickel plating step.
Nickel Plating the Palladium Colloid-Coated Silica One hundred grams of a mixed solution containing 2.0 M of sodium hypophosphite, 1.0 M of sodium acetate and 0.5 M of glycine diluted in ion-exchanged water was used as the reducing solution for nickel plating. The palladium colloid-coated silica prepared in the previous step was dispersed together with 0.5 g of KS-538 (an antifoaming agent made by Nisshin Chemical Industry Co., Ltd.) in the reducing solution for nickel plating. The liquid was heated from room temperature to 65° C. under vigorous agitation. Sodium hydroxide (2.0 M) diluted with ion-exchanged water was added dropwise to the reducing solution by entrainment with air, and nickel sulfate (1.0 M) diluted with ion-exchanged water was added at the same time by entrainment with nitrogen. This caused fine bubbles to form and the silica to turn black, indicating that metallic nickel had deposited over the entire surface of the silica.
Gold Plating the Nickel-Plated Silica One hundred grams of the commercial gold plating solution K-24N (manufactured by Kojundokagaku Kenkyusho K. K.) was used undiluted as the gold plating solution. The silica coated over the entire surface with metallic nickel that was obtained in the preceding step was dispersed in the gold plating solution. The dispersion was heated from room temperature to 95° C. under vigorous agitation, whereupon fine bubbles formed and the silica turned gold in color, indicating that gold had deposited onto the silica surface.

The silica which settled to the bottom of the plating solution was separated off by filtration, rinsed with water and dried (at 50° C. for 30 minutes), following which it was fired in hydrogen within an electric furnace at 300° C. for one hour. Stereomicroscopic examination of the resulting silica showed the entire surface of the silica to be covered with gold. Palladium, nickel and gold were detected in IPC analysis of the gold-plated silica.
Identification of Electrically Conductive Silica Having a Silica-Silicon Compound-Nickel-Gold Construction The gold-plated silica was mixed into an epoxy resin (Araldite A/B), then cured. Electron microscopic examination of slices of the cured mixture confirmed that the metal-plated silica particles had a two-layer construction composed of a silica portion and a multiple-phase plating portion.

This gold-plated silica was subjected to Auger electron spectroscopic analysis in which the constituent elements present in the depth direction were analyzed while ion etching the surface. The results showed that the silica had a four-layer construction comprising, in the depth direction: a gold layer, a nickel layer, a silicon compound layer (containing carbon and silicon), and a silica layer. Examination of the external appearance under a microscope showed that the gold-plated silica was gold in color. The specific gravity was 3.5. The gold layer had a thickness of 0.03 μm, and the nickel layer had a thickness of 0.25 μm.
Properties of Conductive Silica Having a Silica-Silicon Compound-Nickel-Gold Construction The resistivity of the gold-plated silica was determined by filling a cylindrical cell having four terminals with the gold-plated silica. A current of 1 to 10 mA was passed through from an SMU-257 current source (manufactured by Kessler) via two terminals having surface areas of 0.2 cm² at either end of the cylinder, and the voltage drop across two terminals placed at an interval of 0.2 cm in the center of the cylinder was measured with a model 2000 Kessler nanovoltmeter. The resistivity was 2.2 mΩ·cm. The silica was ground in a mortar for one minute, then heat-treated at 200° C. for 4 hours, after which it was examined for changes in the properties. No change was noted in the appearance or resistivity.

Example 1

The following components were stirred and mixed, in the proportions indicated in Table 1, within a planetary mixer at room temperature for 2 hours.

Component A: (a) Dimethylpolysiloxane capped at both ends with trivinylsiloxy groups and having a viscosity at 25° C. of 1,000 cp; and (b) dimethylpolysiloxane capped at both ends with dimethylvinylsiloxy groups and having a viscosity at 25° C. of 1,000 cp.

Component B: As the silica fine powder, a dry silica that had been surface treated to render it hydrophobic (R-972, manufactured by Nippon Aerosil Co., Ltd.; BET specific surface area, 130 m²/g).

Component C: Silver powder having an average particle size of 8 μm.

Next, dicumyl peroxide was added as component D, and mixing was carried out to uniformity at room temperature, thereby giving a silicone composition. The composition was cured by heating at 165° C. for 10 minutes, then subjected to secondary curing at 200° C. for 4 hours, yielding a silicone rubber sheet having dimensions of 80×80×2 (thickness) mm. The volumetric resistivity of the sheet was measured. The measurement results and the viscosity and injection moldability of the composition are shown in Table 1.

Example 2

The following components were stirred and mixed, in the proportions indicated in Table 1, within a planetary mixer at room temperature for 2 hours.

Component A: (d) Dimethylpolysiloxane capped at both ends with dimethylvinylsiloxy groups and having a viscosity at 25° C. of 1,000 cp.

Component B: As the silica fine powder, a dry silica that had been surface treated to render it hydrophobic (R-972, manufactured by Nippon Aerosil Co., Ltd.; BET specific surface area, 130 m²/g).

Component C: Silver powder having an average particle size of 8 μm.

Next, dimethylhydrogenpolysiloxane having the formula:

(5)

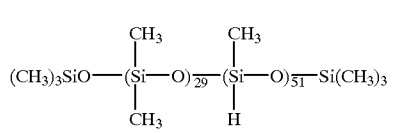

and a 1% solution of hexachloroplatinic acid in 2-ethylhexanol were added as component D, and ethynylcyclohexanol was added as a reaction regulator, then mixing was carried out to uniformity at room temperature, thereby giving a silicone composition. The composition was cured by heating at 120° C. for 10 minutes, yielding a silicone rubber sheet having dimensions of 80×80×2 (thickness) mm. The volumetric resistivity of the sheet was measured. The measurement results and the viscosity and injection moldability of the composition are shown in Table 1.

Example 3

Aside from the use, as component C, of the gold-plated silica powder produced in the synthesis example instead of silver powder, the same components were mixed to uniformity at room temperature in the same manner as in Example 1, giving a silicon composition. The resulting composition was cured by heating at 165° C. for 10 minutes, then subjected to secondary curing at 200° C. for 4 hours, yielding a sheet like that in Example 1. Measurements were carried out as described above. The results are shown in Table 1.

Example 4

Aside from the use, as component C, of the gold-plated silica powder produced in the synthesis example instead of silver powder, the same components were mixed to uniformity at room temperature in the same manner as in Example 2, giving a silicon composition. The resulting composition was cured by heating at 120° C. for 10 minutes, yielding a sheet like that in Example 2. Measurements were carried out as described above. The results are shown in Table 1.

Comparative Examples 1 to 3

Aside from the use, as component A, of (c) a dimethylpolysiloxane capped at both ends with trivinylsiloxy groups and having a viscosity at 25° C. of 1,000,000 cp, the components shown in Table 1 were used to produce silicone rubber sheets in the same manner as in the above examples of the invention. Measurements were carried out as described above. The results are shown in Table 1.

Comparative Examples 4 and 5

Aside from adding and mixing acetylene black in the amounts indicated in Table 1 instead of silver powder as component C, silicone rubber sheets were produced in the same manner as in Example 1. Measurements were carried out as described above. The results are shown in Table 1.

TABLE 1

| Component (pbw) | EX 1 | EX 2 | EX 3 | EX 4 | CE 1 | CE 2 | CE 3 | CE 4 | CE 5 |
|---|---|---|---|---|---|---|---|---|---|
| Organopolysiloxane (a) | 50 | | 50 | | | | | 50 | 50 |
| Organopolysiloxane (b) | 50 | | 50 | | | | | 50 | 50 |
| Organopolysiloxane (c) | | | | | 100 | 100 | 100 | | |
| Organopolysiloxane (d) | | 100 | | 100 | | | | | |
| Organohydrogen-polysiloxane | | 6 | | 6 | | 6 | | | |
| Organic peroxide | 0.6 | | 0.6 | | 0.6 | | 0.6 | 0.6 | 0.6 |
| Platinum catalyst | | 0.2 | | 0.2 | | 0.2 | | | |
| Reaction regulator | | 0.1 | | 0.1 | | 0.1 | | | |
| Dry silica (R-972) | 5 | 5 | 5 | 5 | 5 | 5 | 5 | 5 | 5 |
| Silver powder | 400 | 400 | | | 400 | 400 | | | |
| Gold-plated silica powder | | | 200 | 200 | | | 200 | | |
| Acetylene black | | | | | | | | 10 | 20 |
| Volumetric resistivity ($\Omega \cdot cm$) | $3.3 \times 10^{-5}$ | $3.4 \times 10^{-5}$ | $2.2 \times 10^{-5}$ | $2.5 \times 10^{-5}$ | $3.3 \times 10^{-5}$ | $3.5 \times 10^{-5}$ | $2.5 \times 10^{-5}$ | 5.2 | Mixing Impossible |
| Viscosity (P)[1)] | 8,000 | 6,000 | 6,000 | 6,000 | >120,000 | >120,000 | >120,000 | >120,000 | |
| Injection moldability[2)] | yes | yes | yes | yes | no | no | no | no | |

[1)]Measured using a BS-type rotational viscometer
[2)]Injection moldability was evaluated as the moldability in an injection molding test conducted using an Allrounder 320M injection molding machine manufactured by Arburg Maschinefabrik.

Japanese Patent Application No. 2000-7391 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. An electrically conductive liquid silicone rubber composition comprising:
   (A) 100 parts by weight of an organopolysiloxane bearing at least two alkenyl groups per molecule and having a viscosity of 10 to 100,000 centipoise at 25° C.;
   (B) 1 to 100 parts by weight of a finely divided silica powder;
   (C) 30 to 700 parts by weight of an electrically conductive metal-plated silica powder having a specific surface area of at most 1 m²/g; and
   (D) a curing agent in an amount sufficient to cure the organopolysiloxane.

2. The conductive liquid silicone rubber composition of claim 1, wherein component A is at least one organopolysiloxane of the following average constitutional formula (1):

$$R^1{}_a SiO_{(4-a)/2} \quad (1),$$

wherein $R^1$ is a substituted or unsubstituted monovalent hydrocarbon group of 1 to 12 carbons, from 0.001 to 20 mol % of the $R^1$ groups being alkenyl groups, and the letter a is a positive number from 1.5 to 2.8;
   wherein said organopolysiloxane is formula (1) is capped at both ends of the molecular chain with trivinylsilyl, divinylmethylsilyl or vinyldimethylsilyl groups.

3. The silicone rubber composition of claim 1, wherein component C is a metal-plated silica powder having a construction comprising silica covered with a nickel layer which in turn is covered with a gold layer.

4. The silicone rubber composition of claim 1, wherein the curing agent D is an organic peroxide.

5. The silicone rubber composition of claim 1, wherein the curing agent D is an addition reaction-type curing agent.

6. The silicone rubber composition of claim 1 which is injection moldable.

7. The silicone rubber composition of claim 1, wherein more than one type of said organopolysilixane A is used, wherein said organopolysiloxanes are capped at both ends of the molecular chain with trivinylsilyl, divinylmethylsilyl or vinyldimethylsilyl groups.

8. The silicone rubber composition of claim 2, wherein said a of the organopolysiloxane of formula (1) is a positive number from 1.8 to 2.5.

9. The silicone rubber composition of claim 2, wherein said organopolysiloxane of formula (1) is a linear diorganopolysiloxane also having $R^1 SiO_{3/2}$ units and $SiO_{4/2}$ units.

10. The silicone rubber composition of claim 1, wherein said viscosity of the organopolysiloxane A is 50 to 50,000 centipoise.

11. The silicone rubber composition of claim 1, wherein said finely divided silica powder B is at least a precipitated silica, fumed silica, or fired silica, wherein any of said silica has a specific surface area of 50 to 400 m²/g.

12. The silicone rubber composition of claim 1, wherein said finely divided silica powder B is incorporated in the amount of 2 to 50 parts by weight per 100 parts by weight of said organopolysiloxane A.

13. The silicone rubber composition of claim 1, wherein the average particle size of said electrically conductive metal-plated silica powder C is 0.05 to 100 μm.

14. The silicone rubber composition of claim 1 or 3, wherein said silicone rubber composition comprising a four-layer construction of silica/silicon compound/nickel/gold, wherein said silicon compound is between the silica and nickel.

15. The silicone rubber composition of claim 3, wherein said organopolysiloxane A is dimethylpolysiloxane.

* * * * *